3,431,441
PLASMA PURIFICATION BY MEANS
OF ELECTROSTRICTION
Fredrick H. Shair, Altadena, Calif., assignor to the United States of America as represented by the Secretary of the Air Force
Filed Nov. 5, 1965, Ser. No. 506,919
U.S. Cl. 310—11  1 Claim
Int. Cl. H02k 45/00; G21d 7/02; B03c 3/36

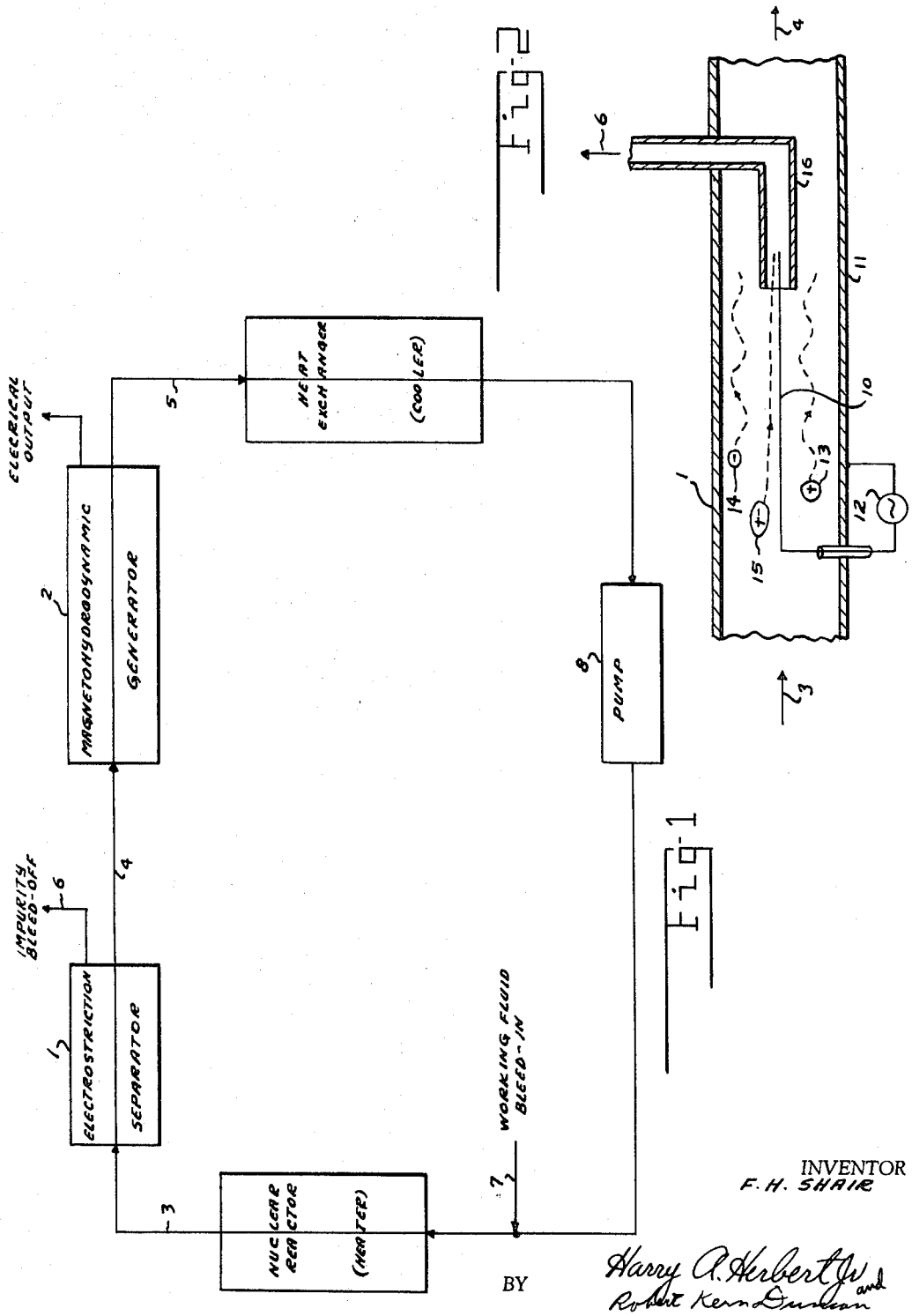

ABSTRACT OF THE DISCLOSURE

The polyatomic impurities in the gas plasma of a closed loop magnetohydrodynamic generator are removed by the electrostriction forces causing the charged polyatomic molecules in a high intensity, nonuniform, alternating electric field created between a central wire and the tube containing the gas flow to be attracted toward the high intensity field near the wire where they are bled out of the system by a small tube extending external the closed system from the high intensity field region near the wire.

---

The efficiency of closed loop magnetohydrodynamic generators employing nonequilibrium ionization is drastically reduced by polyatomic impurities which tend to accumulate within the plasma. Prior means of removing the impurities has involved shutting down the generator, removing gas and recharging the system.

It is thus an object of the present invention to provide apparatus for purifying the plasma gas of a magnetohydrodynamic generator.

It is another object of the present invention to provide a system for purifying the plasma gas of a closed loop magnetohydrodynamic generator that may be inserted in the closed loop plasma flow.

It is another object of the present invention to provide a system for purifying the plasma gas of a closed loop magnetohydrodynamic generator that can be operated simultaneously with the generator, eliminating the necessity of shutting down the generator in order to remove the impurities from the plasma.

Various other objects and advantages will appear from the following description of one embodiment of the invention, and the novel features will be particularly pointed out hereinafter in connection with the appended claims.

FIG. 1 is a block diagram of a closed loop magnetohydrodynamic generator employing the electrostriction separator.

FIG. 2 is a schematic of an embodiment of an electrostriction separator.

In the block diagram of a magnetohydrodynamic generating system shown in FIG. 1, the electrostriction separator 1 is placed before the generator 2 with respect to the plasma flow (symbolically represented by the flow lines 3, 4 and 5). It is to be understood that it may also be placed after the generator or elsewhere in the closed loop. The polyatomic impurities are removed by the electrostriction separator and vented or bled off 6 with a suction (vacuum) pump when the system is operated at subatmospheric working pressures. When the system operates at positive pressures the impurities may be vented through a manually operated valve in either a continuous manner after the system is placed in operation or periodically, after an accumulation of impurities is obtained at the center electrode. In neither instance does the generator need to be shut down while the impurities are being removed. The slight loss of gas from the system may be replenished through a working fluid bleed-in connection 7. In some instances it may be desirable to place the bleed-in connection before the pump 8. The remainder of the system shown in FIG. 1 is well known and conventional to closed loop magnetohydrodynamic generating systems.

FIG. 2 is a schematic diagram of an embodiment of the electrostriction separator. The operation of the separator is based on the polarizability of polyatomic molecules in a nonuniform electric field. The nonuniform electric field is produced between the wire conductor electrode 10 and the concentric tube 11 which contains the plasma gas flow. If it is desirable that the tube 11 confining the gas flow be constructed of an electrically nonconducting substance a conductive sheath may be used to surround the tube.

The nonuniform electric field is produced between the wire electrode 10 and the tube wall 11 by the high voltage AC generator 12. The ions 13, and the electrons 14, merely oscillate as they travel down the tube; on the other hand, the large polyatomic molecules 15 in the plasma gas 3, flowing into the separator concentrate near the wire 10 in the center of the tube. This effect on the polyatomic molecules is due to the electrostriction forces on them, and the effect becomes more apparent with increasing molecular size. It is noted that the flow of the polyatomic molecule is toward the region of high electric field intensity and that this effect takes place on both the positive and negative cycles of the field establishing potentials.

The small concentric tube 16 at the end of the center electrode collects the impurities of polyatomic molecules and bleeds them out of the system. The flow of the plasma gas, which may be helium, through the separator is due to the conventional plasma flow throughout the magnetohydrodynamic system brought about by pressure differences.

The electric potential value of the alternating source 12 is not critical. The larger the voltage, the less time it will take for concentration profiles to be set up, and thus the shorter the electrostriction separator may be to accomplish the same degree of impurity separation. The force on a particle is a function of the magnitude of the electric field and of the magnitude of the field gradient. However, the voltage should not be so large as to create electric breakdown, which can occur if the center electrode is made extremely thin causing the field immediately around it to reach very high values. The polyatomic molecules then can no longer stand the electrical stress and break down becoming charged, thus particles entering the region acquire a charge themselves and are then pushed away from the electrode rather than attracted toward it. A similar breakdown can occur if the applied voltage is too high for a given electrode size.

The frequency of the alternating current source 12 is not critical, but it is important to use AC if extraction of the impurities is desired. Until a DC steady state nonuniform field will attract the polyatomic molecules toward the region of high field intensity it will also tend to separate the charged particles, i.e., the ions and electrons. With an AC field the polyatomic particles moves toward the region of high field intensity irrespective of the polarity of the field. Thus it may be seen why the ions and electrons oscillate slightly, but are not continuously attracted to an electrode, as they move through the field; being alternately attracted and repelled by an electrode as the electrode passes through its cyclic polarity changes. The use of an AC field has another very important advantage in that as the field passes through zero in its cyclic changes the force of attraction by the field on and near the wire 10 is momentarily released. This permits the polyatomic particles to flow with the gas flow and move down the wire (in a jiggling or shimming fashion) and on out the extraction tube 16.

It will be understood that various changes in the details, materials, steps and arrangements of parts, which have been herein described and illustrated in order to explain the nature of the invention may be made by those skilled in the art within the principle and scope of the invention as expressed in the appended claims.

What is claimed is:

1. In combination with a closed loop gas flow magnetohydrodynamic generating system using a nonequilibrium ionized plasma of helium gas, the device for separating the polyatomic particles from the said gas, said device comprising: a wide inner electrode; a cylindrical outer electrode coaxial with the said inner electrode; an alternating potential source cooperating with the said inner electrode and the said outer electrode for creating within the said closed loop a nonuniform elecric field having a high field intensity region; tube venting means cooperating with the said high field intensity region extending exterior to the said closed loop; and gas flow control means cooperating with the said venting tube means for controlling the gas flow through the said venting tube.

References Cited

UNITED STATES PATENTS

| | | | |
|---|---|---|---|
| 1,787,955 | 1/1931 | Rosecrans | 55—123 |
| 3,133,212 | 5/1964 | Szekely | 310—4 |
| 3,184,901 | 5/1965 | Main | 55—154 |
| 3,304,251 | 2/1967 | Walker et al. | 204—184 |

DAVID X. SLINEY, *Primary Examiner.*

U.S. Cl. X.R.

55—123, 151